United States Patent
Tsou et al.

(10) Patent No.: US 8,445,620 B2
(45) Date of Patent: May 21, 2013

(54) ELASTIC PROPYLENE-ALPHA-OLEFIN COPOLYMER COMPOSITIONS AND PROCESSES TO PRODUCE THEM

(75) Inventors: Andy Haishung Tsou, Allentown, PA (US); Gabor Kiss, Hampton, NJ (US); Robert Patrick Reynolds, Jr., Clinton, NJ (US); John W. Chu, Neshanic Station, NJ (US); Alan Anthony Galuska, Huffman, TX (US); Patrick Brant, Seabrook, TX (US); Donald Andrew Winesett, Houston, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 56 days.

(21) Appl. No.: 13/198,201

(22) Filed: Aug. 4, 2011

(65) Prior Publication Data

US 2013/0035442 A1  Feb. 7, 2013

(51) Int. Cl.
| | |
|---|---|
| *C08F 4/00* | (2006.01) |
| *C08F 4/06* | (2006.01) |
| *C08F 4/42* | (2006.01) |
| *C08F 36/00* | (2006.01) |
| *C08F 210/00* | (2006.01) |
| *C08F 110/06* | (2006.01) |

(52) U.S. Cl.
USPC .......... 526/351; 526/348; 526/335; 526/90; 526/131; 526/126

(58) Field of Classification Search
USPC .............. 526/351, 348, 335, 90, 131, 126
See application file for complete search history.

(56) References Cited

U.S. PATENT DOCUMENTS

| | | | |
|---|---|---|---|
| 5,786,432 A | | 7/1998 | Kuber et al. |
| 5,869,723 A | | 2/1999 | Hinokuma et al. |
| 6,057,408 A | | 5/2000 | Winter et al. |
| 6,268,063 B1 | | 7/2001 | Kaminaka et al. |
| 7,432,336 B2 | | 10/2008 | Brant |
| 7,476,710 B2 | | 1/2009 | Mehta et al. |
| 7,807,769 B2 | | 10/2010 | Mehta et al. |
| 7,855,258 B2 | | 12/2010 | Datta et al. |
| 2004/0181024 A1 | | 9/2004 | Nakamura et al. |
| 2007/0015877 A1 | | 1/2007 | Burkhardt et al. |
| 2008/0214767 A1 | | 9/2008 | Mehta et al. |
| 2009/0163642 A1 | * | 6/2009 | Kiss et al. ............ 524/525 |

FOREIGN PATENT DOCUMENTS

| | | |
|---|---|---|
| IN | 191553 | 12/2003 |
| WO | 03040201 | 5/2003 |
| WO | 2007037944 | 4/2007 |

OTHER PUBLICATIONS

Randall, J.C. and S.P. Rucker, "Markovian Statistics for Finite Chains: Characterization of End Group Structures and Initiation, Chain Propagation, and Chain-Transfer Probabilities in Poly(ethylene-co-propylene)", Macromolecules, 27(8), 1994, pp. 2120-2129.
Moore, Jr., Edward P. (Editor), Polypropylene Handbook: Polymerization, Characterization, Properties, Applications, Carl Hanser Verlag (1996), p. 90.
Datta, S., S. Srinivas, C.Y. Cheung, W. Hu, A. Tsou and D.J. Lohse, "Polyolefin elastomers with isotactic propylene crystallinity", Rubber World, 229 (2003), pp. 55-67.

* cited by examiner

*Primary Examiner* — William Cheung
(74) *Attorney, Agent, or Firm* — Robert A. Migliorini

(57) ABSTRACT

Provided are elastic propylene-alpha olefin blocky copolymers. In one form, the elastic propylene-alpha olefin blocky copolymer includes an α-olefin content from 12 to 25 wt % and having a propylene crystallinity less than 30 J/g, a Tm <100° C. and a Tg >−45° C., wherein said copolymer has blocky propylene segments with $r_1r_2$ greater than 1.5, and a process for producing such copolymer.

25 Claims, No Drawings

US 8,445,620 B2

ELASTIC PROPYLENE-ALPHA-OLEFIN COPOLYMER COMPOSITIONS AND PROCESSES TO PRODUCE THEM

FIELD

This disclosure is related to elastic propylene-alpha olefin copolymers with propylene sequence regularity and monomer incorporation mode that allows enhanced elasticity and fast crystallization and enhanced crystallite strength for pellet stability.

BACKGROUND

Polyolefin polymers and polymer blends are known for their versatility and applicability in a wide variety of uses. In particular, many polyolefin polymers, including copolymers of propylene with other α-olefins such as ethylene, are well suited for use in applications requiring good stretchability, elasticity, and strength. Such polymers often comprise a blend of two or more propylene copolymers, and may be manufactured by mechanically blending two or more copolymers, or by in-line reactor blending of the copolymers.

Many polyolefin blends known in the prior art are formed into pellets for intermediate storage purposes before being shaped into articles such as fibers, films, nonwovens, extruded coatings, and molded articles. Some of these compositions, however, are known to exhibit poor pellet stability over extended periods of time, leading to agglomeration of pellets and resulting in pellet batches that a do not flow/pour well, particularly after storage and shipping under hot climate conditions. Further, the typically low melting points of such known polymer blends often lead to flattening or other deformation of polymer pellets during long-term storage, which also negatively affects the ability of the polymer pellets to be free-flowing. While blending such polyolefin copolymers with higher-crystallinity components has been shown to improve stability properties of the polymer pellets, such pellets lose some of their elasticity and still have a tendency to agglomerate during shipping and long-term storage, thus presenting processing issues where free-flowing pellets are required.

As a result, many known polyolefin blend pellets are dusted, such as with a low density polyethylene dust, to prevent agglomeration. The use of such dusts may be problematic for certain applications, however, because they may increase gel levels in films, be unacceptable for use in food contact applications, or create housekeeping issues because of increased dust in the plant environment.

For example, thermoplastic elastomers based on metallocene-polymerized propylene-ethylene copolymers were introduced commercially in 2002-2004. These elastomers have low propylene crystallinity (typically less than 30 J/g) and are truly random with $r_1r_2$ of 1 and have high regio- and stereo-propylene defects. While the introduction of both propylene defects and ethylene comonomer in these propylene-ethylene copolymers contribute to a reduction in polymer crystallinity, it also reduces the propylene crystal strengths. As a result, their pellets are soft with Shore A hardness less than 90 and have a strong tendency to agglomerate after pelletization, which often prevents these pellets from being delivered as free-flowing pellets for subsequent processing into fabricated products, particularly under hot weather conditions.

As disclosed in U.S. Pat. No. 7,476,710, U.S. Provisional Application No. 61/305,987 and U.S. Published Application No. 2007/0015877, incorporated by reference herein in their entireties, polypropylene homopolymers or copolymers with moderate to high crystallinity, such as >50 J/g, can be blended in with propylene-ethylene elastomers, typically at levels of 10 to 15 wt %, to obtain acceptable pellet stability.

U.S. Pat. No. 6,268,063 discloses a propylene resin composition featuring good flexibility and transparency without producing sticky feeling, and comprising a polypropylene component and a random copolymer component of propylene and ethylene.

U.S. Published Application No. 2004/0181024 discloses polypropylene-based random copolymer blend compositions which are excellent in processability, stiffness, heat-sealing property, resistance to blocking and surface scratching.

U.S. Pat. No. 7,432,336, incorporated by reference herein in its entirety, discloses propylene-based copolymers and processes for producing them, particularly propylene-ethylene copolymers, which may contain up to 28 wt % ethylene comonomer.

However, none of these prior art efforts has resulted in polymer compositions having satisfactory pellet stability and low cost of production. Thus, there is still a need for improved pellets formed from polymer blends which have long-term pellet stability and are free-flowing without being dusted.

SUMMARY

In one aspect, the disclosure resides in an elastic propylene-alpha olefin blocky copolymer comprising an α-olefin content from 12 to 25 wt % and having a propylene crystallinity less than 30 J/g, a melting peak temperature (Tm) of <100° C. and a glass transition temperature (Tg) of >−45° C., wherein said copolymer has blocky propylene segments with $r_1r_2$ greater than 1.5. In an advantageous embodiment, the α-olefin is ethylene.

Conveniently, the elastic propylene-alpha olefin blocky copolymer has a heat of fusion in the second melt cycle that is equal to or higher than $0.188 \times E^2 - 8.5 X e + 95$ J/g, where E equals to the value of ethylene content in wt %.

The elastic propylene-alpha olefin blocky copolymer can further be characterized as having EPP triad regio-defects of less than 3%, or less than 2%, or even less than 1%.

Advantageously, the elastic propylene-alpha olefin blocky copolymer is characterized as having $r_1r_2$ of greater than 2.0, or even greater than 2.5.

In a further embodiment, the elastic propylene-alpha olefin blocky copolymer has an α-olefin content from 15 to 25 wt %. In some embodiments, when the α-olefin is ethylene, the ethylene content ranges from 12 to 25 wt %, or from 15 to 25 wt %.

It is further preferable that the elastic propylene-alpha olefin blocky copolymer has a propylene crystallinity less than 25 J/g, or even less than 20 J/g; and an elasticity of greater than 500%, and less than 25% tension set after a first 200% extension; or even an elasticity of greater than 500% and less than 25% tension set after a first 200% extension and less than 10% tension set after a second 200% extension.

In a particularly advantageous embodiment, the elastic propylene-alpha olefin blocky copolymer can be formed into pellets having a pellet surface contact angle against water of less than 120° C., or even less than 115° C.

Additionally, the elastic propylene-alpha olefin blocky copolymer can further comprise at least one non-conjugated diene, such as where the non-conjugated diene content is between 0.1 wt % and 10 wt %; and the non-conjugated diene is selected from the group consisting of ethylidene norbornene (ENB), vinylidene norbornene (VNB), norbornadiene (NBD), alpha-omega dienes such as 1,5-hexadiene, 1,7-octadiene, 1,9-decadiene, and the like.

Conveniently, the elastic propylene-alpha olefin blocky copolymer can have an $MFR_{2.16kg@230C}$ (ASTM D1238) of less than 8 g/10 min, or less than 5 g/10 min, or less than 2 g/10 min, or even less than 1 g/10 min.

In another embodiment, the elastic propylene-alpha olefin blocky copolymer has a Tm from 30° C. to 100° C., or from 30° C. to 90° C., or even from 60° C. to 80° C.; and has a Tg from −45° C. to −10° C., or from −45° C. to −15° C.

Advantageously, the elastic propylene-alpha olefin blocky copolymer can be combined into a polymer blend comprising polypropylene.

In another embodiment, the present disclosure is directed to a polymerization process comprising feeding propylene, an α-olefin, and optionally an inert solvent into one or more reactor trains connected in parallel, each reactor train comprising one or more reactors connected in series; feeding one or more metallocene catalysts into the said one or more reactor trains, wherein the one or more metallocene catalysts are activated either before feeding to or in the reactor.

The activated catalyst is prepared from (i) a precursor selected from the group consisting of dimethyl(bridged)bis (2-alkyl-4-arylindenyl) Group 4 transition metal or dichloro (bridged)bis(2-alkyl-4-arylindenyl) Group 4 transition metal compounds, where the group bridging the two 2-alkyl-4-arylindenyl groups connected to the Group 4 transition metal can be dimethylsilyl, diphenylsilyl, alkyl- or aryl-substituted dimethyl- or diphenyl silyl, the alkyl substituent on the in the 2 position of the 2-alkyl-4-arylindenyl group can be methyl, ethyl, or isopropyl, the aryl substituent in the 4 position of the 2-alkyl-4-arylindenyl group can be optionally substituted naphthyl, tetrahydronaphthyl, fluorenyl, phenanthryl, carbazyl, and hexahydropyrenyl, and the Group 4 transition metal can be Ti, Zr, or Hf, and (ii) an activator selected from the group consisting of methylaluminoxane (MAO), dimethylanilinium- or trityl-fluoroarylborates, wherein the fluoroaryl group is pentafluorophenyl, perfluoronaphthyl, or quadrafluoro-trihydronaphthyl; and polymerizing said propylene and said α-olefin in a homogeneous fluid phase to form an elastic propylene-alpha-olefin copolymer having a propylene crystallinity less than 30 J/g, a Tm <100° C. and a Tg >−45° C., wherein said copolymer has blocky propylene segments with $r_1r_2$ greater than 1.5.

The metallocene catalyst precursor can be one or more of dimethyl(μ-dimethylsilyl)bis(2-methyl-4-naphthylindenyl) zirconium, dichloro(μ-dimethyl-silyl)bis(2-methyl-4-naphthylindenyl)zirconium, dimethyl(μ-dimethylsilyl)bis(2-isopropyl-4-naphthylindenyl)zirconium, dichloro(μ-dimethylsilyl)bis(2-isopropyl-4-naphthylindenyl)zirconium, dimethyl(μ-diphenylsilyl)bis(2-methyl-4-naphthyl-indenyl) zirconium, dichloro(μ-diphenylsilyl)bis(2-methyl-4-naphthylindenyl)-zirconium, dimethyl(μ-diphenylsilyl)bis(2-isopropyl-4-naphthyl-indenyl)-zirconium, dichloro(μ-diphenyl-silyl)bis(2-isopropyl-4-naphthylindenyl)-zirconium, dimethyl(μ-dimethylsilyl)bis(2-alkyl-4-carbazylindenyl)zirconium, dichloro(μ-diphenylsilyl)bis(2-alkyl-4-carbazylindenyl)zirconium, dimethyl(μ-diphenylsilyl)bis(2-alkyl-4-carbazylindenyl)zirconium, dichloro(μ-diphenyl-silyl)bis(2-alkyl-4-carbazylindenyl)zirconium, dimethyl(μ-dimethylsilyl)bis(2-methyl-4-tetrahydronaphthylindenyl)zirconium, dimethyl(μ-dimethylsilyl) bis(2-methyl-4-phenanthrylindenyl)zirconium, dimethyl(μ-dimethylsilyl)bis(2-methyl-4-fluorenylindenyl)zirconium, dimethyl(μ-diphenylsilyl)bis(2-methyl-4-tetra-hydronaphthylindenyl)zirconium, dimethyl(μ-diphenylsilyl)bis(2-methyl-4-phenanthrylindenyl)zirconium, dimethyl(μ-diphenyl-silyl)bis(2-methyl-4-fluorenylindenyl)zirconium, their corresponding Hf derivatives, and combinations thereof; and wherein the copolymer has EPP triad regio-defects of less than 3%.

In one particular embodiment, the α-olefin is ethylene; and the reactor temperature is maintained between about 50° C. and about 130° C. during polymerization; and the reactor pressure is maintained between about 1200 psig (8.4 MPa) and about 3000 psig (20.8 MPa) during polymerization.

Advantageously, during the process the α-olefin is ethylene and the amount of ethylene, relative to the amount of ethylene plus propylene in the feed to the one or more parallel reactor trains of the process, is between 8 and 20 wt %.

DETAILED DESCRIPTION

All numerical values within the detailed description and the claims herein are modified by "about" or "approximately" the indicated value, and take into account experimental error and variations that would be expected by a person having ordinary skill in the art.

Described herein is a process for producing elastic propylene-alpha olefin copolymers with propylene sequence regularity that allows fast crystallization and enhanced crystallite strength for pellet stability. Most specifically, this disclosure is directed to synthesis of pellet-stable elastic propylene-ethylene blocky copolymers, with ethylene content from 12 to 25 wt % and with propylene crystallinity of less than 30 J/g using stereo- and regio-regular metallocene catalysts that yield propylene segments with $r_1r_2$ value greater than 1.5, or greater than 2.0, or even greater than 2.5, and with regio-defects in the continuous propylene segments of such copolymers less than 3%, or less than 2%, or even less than 1%. The thus-produced thermoplastic elastomer has high elasticity of greater than 500% elongation and less than 25% tension set after 200% first extension and less than 10% tension set after 200% second extension.

Conventionally, in order to obtain copolymers of propylene with other α-olefins such as ethylene, which are well suited for use in applications requiring good stretchability, elasticity, and strength, such polymers are often a blend of two or more propylene polymers, such as a high crystallinity propylene homo- or copolymer, and a low crystallinity propylene-α-olefin copolymer elastomer, and may be manufactured by mechanically blending two or more copolymers, or by in-line reactor blending of the copolymers. These elastomers have low propylene crystallinity (typically less than 30 J/g) and are truly random copolymers with $r_1r_2$ of 1, achieved by formulating and polymerizing the elastomers to impart high regio- and stereo-propylene defects. The introduction of both propylene defects and increasing levels of α-olefin comonomer in these propylene-α-olefin copolymers contribute to a controlled reduction in polymer crystallinity yielding elastic products.

In contrast, according to the present disclosure, copolymerizing propylene and α-olefins with certain activated metallocene catalysts results in an elastomeric copolymer having distinctly blocky sections of crystalline propylene repeating units, interrupted by α-olefin comonomer repeating units. The blockiness of the inventive copolymer elastomers is evident by their $r_1r_2$ values which are greater than 1.5. As stated above, it is known in the art that when $r_1r_2$ is approximately 1, such copolymers are substantially random copolymers, and where $r_1r_2$ is less than 1, or even 0, the copolymers are substantially alternating copolymers having alternating comonomer structure. However, when $r_1r_2$ is greater than 1, a "blocky" structure is evidenced, as described above. Here, $r_1$ and $r_2$ are monomer incorporation probability ratios well known in the art of copolymerization and for polyolefin copolymers can be determined by $^{13}C$ NMR analysis as described in J. C. Randall and S. P. Rucker, *Macromolecules* 27(8) (1994) 2120. The product of $r_1$ and $r_2$ yields a value reflecting the frequency of monomer A following monomer A times the frequency of monomer B following monomer B per the frequency of monomer A following monomer B times the frequency of monomer B following monomer A. In certain regard, $r_1 r_2$ characterizes the ratio of monomer incorporation events resulting in identical neighboring monomers vs. events resulting in different neighboring monomers in the polymer chain. As explained on page 90 of the *Polypropylene Handbook Polymerization, Characterization, Properties, Applications*, Edward P. Moore, Jr. (Ed.), Carl Hanser Verlag (1996), this $r_1 r_2$ value is characteristically different depending on whether the monomer incorporation in copolymers is blocky, alternating, or random in nature. Specifically, $r_1 r_2$ values above 1.0 are indicative of blocky monomer distribution along the polymer chain (resulting, on average, in longer sequences of the same monomer at the same monomer composition than that occurring in the corresponding random or alternating copolymers), values below 1.0 are indicative of alternating monomer structure, while values close to 1.0 associated with random monomer incorporation.

The present approach in delivering the necessary elasticity in propylene-ethylene or propylene-α-olefin copolymers, with improved pellet stability as compared to the current state-of-the-art products, is achieved by using metallocene catalysts that yield high stereo- and regio-selectivity in the continuous propylene segments of the disclosed copolymers while also affording copolymers of a blocky nature with $r_1 r_2$ greater than 1.5, or greater than 2.0, or even greater than 2.5. The lowering of polymer crystallinity in the disclosed propylene-α-olefin copolymers to arrive at optimal elasticity is attained, in essence, only by the addition of an α-olefin, preferably ethylene comonomer, that breaks up the crystal-forming continuous propylene segments. This is in contrast to the approach used in the current state of the art that relies on a combination of defects in the continuous propylene segments and incorporating comonomers (see *Rubber World*, 229 (2003) p. 55; WO 2007/037944A2 and WO 2003/040201A1).

The crystallizable propylene sequences are thus essentially defect-free and ethylene or α-olefin comonomers are incorporated into the amorphous connecting segments in between the crystallizable continuous propylene segments. Furthermore, the currently disclosed propylene-based copolymers also have a blocky monomer distribution in the polymer chain. These attributes afford improved pellet stability while maintaining or even improving elasticity.

In comparison with high-defect commercial propylene-ethylene elastic copolymers, the low-defect blocky copolymers of the present disclosure have higher cohesive strengths derived from the crystallization of the relatively longer continuous propylene segments in these polymers, as reflected by their higher melting peak temperatures, faster crystallization rate, and better elasticity due to their longer flexible connecting amorphous segments. The higher crystal strength and faster crystallization rate leads to faster hardening of pellets and thus better pellet stability, whereas the high crystal strength and flexible connecting segments deliver better elasticity (less set and higher retracting force).

The disclosure further delivers an elastomer product that has higher ethylene content, optionally higher molecular weight, and better elasticity while having the same amount of crystallinity (as characterized by the heat of fusion or by the melting peak temperature) as that of a high-defect (increased stereo- and regio-defect concentration in the continuous propylene segments) commercial propylene-ethylene elastic copolymers. Higher ethylene content at the same level of crystallinity, blocky monomer sequences, and the availability of higher molecular weight/lower melt flow rate (MFR) in turn provide substantial performance advantages that broaden the application field and/or improve product performance when substituted for the currently available analogous products.

The higher ethylene content at the same crystallinity (as characterized by the heat of fusion or by the melting peak temperature) makes the currently disclosed elastomer a better compatibilizer vs. the state of the art products in rubber-toughened polypropylenes. Advantageously, the ethylene content can be controlled to be greater than 12 wt %, or greater than 13 wt %, or greater than 14 wt %, or even greater than 15 wt %, and up to 25 wt %. This is because the same crystallinity is achieved at higher ethylene concentrations than in the current commercial products, which in turn makes the compatibilizers made according to the present disclosure less compatible with polypropylenes, yielding a better morphology and performance of the final product blend.

The reduced miscibility with highly crystalline propylene-rich polymers, such as polypropylenes and random copolymers (RCPs), may also lead to improved pellet stability when the currently disclosed low-defect blocky copolymers are blended with polypropylenes and RCPs. Such blends are also part of the current disclosure. Without being bound by any particular theory, there are indications that pellet stability is enhanced by the more facile surface segregation of the propylene-rich components making the surface less sticky. As mentioned before, pellet stability is also believed to be improved by faster crystallization and enhanced crystal strength stemming from less defects in the continuous propylene segments and from the longer propylene runs due to blockiness.

The currently disclosed polymers can be readily prepared with high molecular weights due to the increased molecular weight capability of the catalysts affording higher regio- and stereo-regularity. The increased molecular weights yield melt flow rates (MFRs) as low as 8 g/10 min, or 5 g/10 min, or 2 g/10 min, or 1 g/10 min, or even below 1 g/10 min. The higher molecular weight/lower MFR, in turn, allows the disclosed polymers to be deployed in new application fields, such as, for example, stretch-cling films. When copolymerizing with small amounts of dienes, the better elasticity of the currently disclosed polymers also affords the manufacture of fully elastic fibers and films after cross-linking.

The currently disclosed polymers can be readily prepared with relatively low heats of fusion ($\Delta H_f$), evidencing their propylene crystallinity, such as less than 30 J/g, or less than 25 J/g, or even less than 20 J/g; and relatively low melting peak temperatures (Tm) of less than 100° C., such as between 30° C. to 100° C., or from 30° C. to 90° C., or even from 60° C. to 80° C.; and glass transition temperatures (Tg) from −45° C. to −10° C., or from −45° C. to −15° C.

The polymerization process of the present disclosure employs a homogeneous metallocene solution process to prepare the disclosed elastic propylene-α-olefin copolymers. The inherent advantages of a homogenous solution process over the conventional slurry or gas phase processes using supported metallocene catalysts or Ziegler-Natta catalysts are fouling-free reactor operations, typically less ash, lower inorganics, such as Si and Group IV metals. Thus, the polymers of the current disclosure typically contain less than 10 total wt ppm of Group 4 transition metal and Si, and the Si/Group 4 transition metal ratios are less than 2.0.

Examples of suitable catalyst precursors are dimethyl (bridged)bis(2-alkyl-4-arylindenyl) Group 4 transition metal or dichloro(bridged)bis(2-alkyl-4-arylindenyl) Group 4 transition metal compounds, where the group bridging the two 2-alkyl-4-arylindenyl groups connected to the Group 4 transition metal can be dimethylsilyl, diphenylsilyl, alkyl- or aryl-substituted dimethyl- or diphenyl silyl, the alkyl substituent on the in the 2 position of the 2-alkyl-4-arylindenyl group can be methyl, ethyl, or isopropyl, the aryl substituent in the 4 position of the 2-alkyl-4-arylindenyl group can be optionally substituted naphthyl, tetrahydronaphthyl, fluorenyl, phenanthryl, carbazyl, and hexahydropyrenyl, and the Group 4 transition metal can be Ti, Zr, or Hf, such as dimethyl (µ-dimethylsilyl)bis(2-methyl-4-naphthylindenyl)zirconium, dichloro(µ-dimethyl-silyl)bis(2-methyl-4-naphthylindenyl)zirconium, dimethyl(µ-dimethylsilyl)bis(2-isopropyl-4-naphthylindenyl)zirconium, dichloro(µ-dimethylsilyl)bis(2-isopropyl-4-naphthylindenyl)zirconium, dimethyl(µ-diphenylsilyl)bis(2-methyl-4-naphthyl-indenyl)zirconium, dichloro(µ-diphenylsilyl)bis(2-methyl-4-naphthylindenyl)-zirconium, dimethyl(µ-diphenylsilyl)bis(2-isopropyl-4-naphthyl-indenyl)-zirconium, dichloro(µ-diphenylsilyl)bis(2-isopropyl-4-naphthylindenyl)-zirconium, dimethyl(µ-dimethylsilyl)bis(2-alkyl-4-carbazylindenyl)zirconium, dichloro(µ-diphenylsilyl)bis(2-alkyl-4-carbazylindenyl)zirconium, dimethyl(µ-diphenylsilyl)bis(2-alkyl-4-carbazyl-indenyl)zirconium, dichloro(µ-diphenyl-silyl)bis(2-alkyl-4-carbazylindenyl)zirconium, dimethyl(µ-dimethylsilyl)bis(2-methyl-4-tetrahydronaphthylindenyl)zirconium, dimethyl (µ-dimethylsilyl)bis(2-methyl-4-phenanthrylindenyl) zirconium, dimethyl(µ-dimethylsilyl)bis(2-methyl-4-fluorenylindenyl)zirconium, dimethyl(µ-diphenylsilyl)bis(2-methyl-4-tetra-hydronaphthylindenyl)zirconium, dimethyl (µ-diphenylsilyl)bis(2-methyl-4-phenanthrylindenyl) zirconium, dimethyl(µ-diphenylsilyl)bis(2-methyl-4-fluorenylindenyl)zirconium, or their corresponding Hf or Ti derivatives.

The activators for these metallocene catalysts can be methylaluminoxane (MAO), or a non-coordinating anion activator selected from the group consisting of dimethylanilinium- or trityl-fluoroarylborates, wherein the fluoroaryl group is pentafluorophenyl, perfluoronaphthyl, or quadrafluoro-trihydronaphthyl.

A further advantage of this process for manufacturing propylene-α-olefin elastomeric copolymers comes from the higher catalytic activity and higher molecular weight capability over the metallocene catalysts used to prepare high-defect commercial propylene-ethylene copolymers or over supported metallocene catalysts used in slurry or gas phase processes. The higher molecular weight capability allows the production at higher reactor temperatures for higher productivity and lower cooling cost when adiabatic reactors are used.

The disclosure will now be more particularly described with reference to the following Examples.

EXAMPLES

Polymerization experiments were performed in a continuous stirred tank reactor (CSTR) made by Autoclave Engineers, Erie Pa. The reactor was designed to operate at a maximum pressure and temperature of 2000 bar (30 kpsi) and 225° C., respectively. Two reactor configurations with interchangeable reactors were used. The nominal reactor volumes were either 370 mL or 150 mL with working volume of 347 mL and 127 mL, respectively (working volume lower due to reactor internals). The reactor was equipped with a magnetically coupled external stirrer (Magnedrive). A pressure transducer located on the monomer feed line measured the pressure in the reactor. The reactor temperature was measured using a type-K thermocouple. The reactor was protected against over-pressurization by automatically opening an air-actuated valve in case the reactor pressure exceeded the preset limit. A flush-mounted rupture disk located on the side of the reactor provided further protection against catastrophic pressure failure. All product lines were heated to ~150° C. to prevent fouling. The reactor had two electric heating bands that were controlled by a programmable logic control device (PLC). Except for the heat losses to the environment, the reactor did not have cooling (semi-adiabatic operations).

The conversion in the reactor was monitored by the temperature difference between the reaction mixture and the outside reactor skin and by an on-line gas chromatograph (GC) that sampled both the feed and the effluent. The GC analysis utilized the propane impurity present in the propylene feed as an internal standard. The reactor temperature and the temperature difference across the reactor wall was maintained constant by adjusting the reactor heater output (skin temperature) and the catalyst feed rate. The target reactor temperature was typically maintained at 20-200 mol ppb catalyst concentrations in the feed.

Propylene-ethylene monomer blends were fed from a low-pressure cylinder equipped with a dip leg for liquid delivery to the reactor. A heating blanket (Ace) was used to increase the propylene cylinder head pressure to 17 bar (~250 psig). This increased head pressure allowed the monomer to be delivered to the monomer feed pump head at a pressure above its bubble point at the pump. The low-pressure monomer feed was also stabilized against bubble formation by cooling the pump head using 10° C. chilled water. The purified monomer feed was fed by a diaphragm pump (Model MhS 600/11, ProMinent Orlita, Germany) through the stirrer head into the reactor. The monomer flow rate was adjusted by adjusting the motor speed of the pump and was measured by a Coriolis mass flow meter (Model PROline Promass 80, Endress and Hauser) located downstream of the purification traps and before the feed pump. The reported feed flows were determined by averaging the flow rate recorded during the entire balance period.

The catalyst feed solution was prepared inside an argon-filled dry box (Vacuum Atmospheres). The atmosphere in the glove box was purified to maintain <1 ppm $O_2$ and <1 ppm water. All glassware was oven-dried for a minimum of 4 hours at 110° C. and transferred hot to the antechamber of the dry box. Stock solutions of the catalyst precursors and the activators were prepared using Na—K alloy-treated toluene and stored in amber bottles inside the dry box. Aliquots were taken to prepare fresh activated catalyst solutions. The activated catalyst solution was charged inside the argon-filled dry box to a heavy-walled glass reservoir (Ace Glass, Inc. Vineland, N.J.) and was pressurized to 5 psig with argon. The glass feed vessel was wrapped with aluminum foil to prevent decomposition caused by light exposure. The activated catalyst feed solutions were typically stable and usable for several days.

HPLC grade hexane (95% n-hexane, J. T. Baker) was used to prepare the scavenger solution. The solvent was purged with argon for a minimum of four hours and was filtered once over activated basic alumina. The filtered hexane was stored in a 4-liter glass vessel (Ace Glass, Vineland, N.J.) inside an argon-filled dry box. The scavenger solution was prepared by adding 1.5 mL (1.05 g) of trioctylaluminium (Aldrich #38, 655-3) to the 4-liter reservoir of filtered hexane. 5-10 psig head pressure of argon was applied to the glass vessel to deliver the scavenger solution to a 4-liter metal feed vessel inside the containment cell. After refilling, the metal feed vessel was isolated from the glass storage vessel in the dry box and was placed under 3.4 bar (50 psig) head pressure of $N_2$. This feed vessel was also equipped with a differential pressure gauge to monitor the scavenger solution inventory.

During a polymerization experiment, the reactor was preheated to ~10-15° C. below that of the desired reaction temperature. Once the reactor reached the preheat temperature, the scavenger pump was turned on to deliver hexane/trioctylalumium scavenger solution to the reactor from the 4-liter scavenger solution feed vessel. After the flow of scavenger solution to the reactor was verified by monitoring the amount of scavenger solution taken from the feed vessel, the monomer pump was turned on. The reactor was purged when the pressure increased to ~100 bar (~1.5 kpsi) by opening each valve briefly. This reduced the pressure in the reactor and verified that all ports in the reactor were operational. After all valves had been tested and the reactor reached the desired reaction pressure, the syringe pump containing the activated catalyst solution was pressurized. When the syringe pump pressure exceeded the reactor pressure by 27 bar (~400 psi) an air actuated solenoid valve was opened to allow the catalyst solution to mix with the stream of flowing scavenger solution upstream of the reactor. This stream of scavenger/catalyst solution entered the reactor through a port on the side of the reactor. The arrival of the catalyst to the reactor was indicated by an increase in the reaction temperature caused by the exothermic polymerization reaction. During the line-out period, the catalyst feed and lock-hopper rates were adjusted to reach and maintain the target reaction temperature, pressure, and conversion. Once the reactor reached steady state at the desired conditions, the reactor effluent was switched from the waste collection to the on-balance product collection vessel. The reactor was typically on-balance between 30 to 90 min and the on-balance products were collected and treated with a stabilizer (Irganox 1010) to prevent degradation. The stabilized products were weighed after vacuum-drying overnight at 70° C. Aliquots of the product were used for characterization without homogenizing the entire product yield.

Using the polymerization procedures and equipment described above, propylene-ethylene copolymers were selected or prepared as listed in Table 1. The Reference examples were selected from previously produced, metallocene-catalyzed propylene-ethylene random copolymers having the compositional characteristics set forth in Table 1. The inventive Examples 1-3 were made with a catalyst precursor dimethyl(μ-dimethylsilyl)bis(2-methyl-4-naphthylindenyl)-zirconium (hereinafter "P2"), and activated prior to feeding to the reactor with dimethylanilinium-tetrakis(heptafluoronaphthyl)borate activator (hereinafter "A2"). The ethylene content was determined based on calibrated infrared spectroscopy following the methodology in ASTM D3900. Heat of fusion and melting peak temperatures were measured by differential scanning calorimetry (DSC). Molecular weights were measured by gel-permeation chromatography (GPC), whereas $r_1 r_2$ and regio-defects were determined from $^{13}C$ NMR. In general, the analytical methods used for characterizing the copolymers of the present disclosure were the same as disclosed in U.S. Pat. No. 7,910,679 to Kiss et al., incorporated herein by reference in its entirety.

As indicated in Table 1, Ref 1 and Ref 2 random copolymers had higher regio-defects, whereas the catalyst made using P2/A2 provides a material with a blocky nature and almost defect-free.

TABLE 1

| Sample | Catalyst | Ethylene (wt %) | MFR (g/10 min) | Mw | $r_1 r_2$ | Regio defect % in EPP triad |
|---|---|---|---|---|---|---|
| Ref. 1 | — | 11 | 7 | 196K | 0.8 | 3.5% |
| Ref. 2 | — | 15 | 17 | 134K | 0.75 | 3.5% |
| Ex. 1 | P2/A2 | 18.1 | 3.4 | 211K | 3.0 | 0.7% |
| Ex. 2 | P2/A2 | 17.0 | 4.1 | 212K | 1.8 | Not analyzed |
| Ex. 3 | P2/A2 | 17.2 | 5.2 | 206K | 1.77 | Not analyzed |

All samples were compression molded into pads and allowed to age for two weeks, for the completion of crystallization at room temperature before DSC and mechanical testing. Mechanical testing was conducted according to the methods set forth in U.S. Pat. No. 7,855,258, incorporated by reference herein in its entirety. The enthalpy of melting during the first heat at 10° C./min was used as a measure of the degree of crystallinity, whereas an Intron tensile testing machine was used for determining the modulus and the tension set after elongation for 200%. Note that the tension set after the second cycle to 200% elongation was also observable, since these elastomers became more elastic after stretching.

As shown in Table 2, the better propylene sequence regularity in Example 1 renders the material with higher crystallinity and higher modulus despite its higher ethylene content. Additionally, its higher crystallinity and modulus are not detrimental to its elasticity. For the Reference sample copolymers, the modulus and the crystallinity can only be raised with a reduction in ethylene content, which leads to a conversion of the material from elastic to plastic. The elasticity of Example 1 is actually better than the elasticity of Reference 2 despite its higher ethylene content.

TABLE 2

| Sample | DSC Crystallinity $\Delta H_f$ (J/g) | Modulus | Tension Set 1st | Tension Set 2nd |
|---|---|---|---|---|
| Ref. 1 | 28 | 2124 psi | 70% | Not elastic |
| Ref. 2 | 11 | 1270 psi | 19.5% | 9.5% |
| Ex. 1 | 14* | 1360 psi | 19.5% | 8.0% |
| Ex. 2 | 20* | Not determined | Not determined | Not determined |
| Ex. 3 | 24* | Not determined | Not determined | Not determined |

*first melt

This improvement in elasticity observed in Example 1 versus that found in Reference 2 can be rationalized by its lower Tg and higher Tm. Higher Tm suggests better cohesive strength of the physically "cross-linked" crystallites whereas lower Tg indicates more flexible connecting chain segments between the cross-linked crystallites. By physical cross-linking we mean a physical bonding created by the cohesion force between two molecules present in the same crystallite. The Tm and Tg values of all samples evaluated using DSC are listed in Table 3.

Additionally, as a result of the better propylene sequence backbone regularity, higher surface crystallinity on the pellet surface is expected in Example 1. Indeed, the surface crystallinity of Example 1 was found to be the same or slightly better than that of Reference 1. Both are significantly greater than Reference 2. Note, however, that the currently-disclosed blocky copolymers with highly regio- and stereo-regular propylene segments achieve improved surface crystallinity at significantly higher ethylene concentrations.

As a result of the higher surface crystallinity, surface contact angles against water are lower for Reference 1 and Example 1. Both higher surface crystallinity and lower surface contact angle could deliver pellet stability without the agglomeration issues. There are corresponding commercial products of Reference 1 and Reference 2, where Reference 1 was found to be pellet stable and Reference 2 was not. Therefore, it can be expected that Example 1 will be pellet stable since its surface crystallinity and contact angle are the same as those of the pellet-stable Reference 1.

TABLE 3

| Sample | Tm (° C.) | Tg (° C.) | Surface Crystallinity | Pellet Surface Contact Angle | Commercial product pellet stability |
|---|---|---|---|---|---|
| Ref. 1 | 54 | −5 | Moderate | 110° | Stable |
| Ref. 2 | 47 | −9 | Low | 120° | Not Stable |
| Ex. 1 | 51 | −32 | Moderate | 110° | N/A |
| Ex. 2 | 46.7 | −32.9 | — | — | — |
| Ex. 3 | 46.6 | −32.0 | — | — | — |

We should point out that the use of other metallocene precursors yielding highly stereo- and regio-regular propylene segments are also contemplated. Non-exclusive examples of such metallocene precursors include other zirconium or hafnium derivatives of bridged 2,4-substituted(bis) indenyl metallocenes.

PCT AND EP CLAIMS

1. An elastic propylene-alpha olefin blocky copolymer comprising an α-olefin content from 12 to 25 wt % and having a propylene crystallinity less than 30 J/g, a Tm <100° C. and a Tg >−45° C., wherein said copolymer has blocky propylene segments with $r_1 r_2$ greater than 1.5, or greater than 2.0.

2. The elastic propylene-alpha olefin blocky copolymer of claim 1, wherein the α-olefin is ethylene.

3. The elastic propylene-alpha olefin blocky copolymer of claim 1 or 2, wherein the heat of fusion in the second melt cycle is equal to or higher than $0.188 \times E^2 - 8.5 \times E + 95$ J/g, where E equals to the value of ethylene content in wt %.

4. The elastic propylene-alpha olefin blocky copolymer of any of the preceding claims, having EPP triad regio-defects of less than 3%, or less than 2%.

5. The elastic propylene-alpha olefin blocky copolymer of any of the preceding claims, wherein the α-olefin content from 12 to 25 wt %, or from 15 to 25 wt %.

6. The elastic propylene-alpha olefin blocky copolymer of any of the preceding claims, wherein the propylene crystallinity is less than 25 J/g, or less than 20 J/g.

7. The elastic propylene-alpha olefin blocky copolymer of any of the preceding claims, having an elasticity of greater than 500% and less than 25% tension set after a first 200% extension and optionally less than 10% tension set after a second 200% extension.

8. The elastic propylene-alpha olefin blocky copolymer of any of the preceding claims, which when formed into pellets has a pellet surface contact angle against water of less than 120°, or less than 115°.

9. The elastic propylene-alpha olefin blocky copolymer of any of the preceding claims, further comprising between 0.1 wt % and 10 wt % of at least one non-conjugated diene selected from the group consisting of ethylidene norbornene (ENB), vinylidene norbornene (VNB), norbornadiene (NBD), 1,5-hexadiene, 1,7-octadiene, and 1,9-decadiene.

10. The elastic propylene-alpha olefin blocky copolymer of any of the preceding claims, having an $MFR_{2.16kg@230C}$ of less than 8 g/10 min, or less than 5 g/10 min.

11. The elastic propylene-alpha olefin blocky copolymer of any of the preceding claims, which has a Tm from 30° C. to 100° C., or from 30° C. to 90° C., or from 60° C. to 80° C.

12. The elastic propylene-alpha olefin blocky copolymer of any of the preceding claims, which has a Tg from −45° C. to −10° C., or from −45° C. to −15° C.

13. A polymer blend comprising polypropylene and a blocky copolymer according to any of the preceding claims.

14. A polymerization process comprising: feeding propylene, an α-olefin, preferably ethylene, and optionally an inert solvent into one or more reactor trains connected in parallel, each reactor train comprising one or more reactors connected in series; feeding one or more metallocene catalysts into said one or more reactor trains, wherein the metallocene catalysts comprise: (i) a metallocene catalyst precursor selected from the group consisting of dimethyl(bridged)bis(2-alkyl-4-arylindenyl) Group 4 transition metal and dichloro(bridged)bis (2-alkyl-4-arylindenyl) Group 4 transition metal compounds, wherein the group bridging the two 2-alkyl-4-arylindenyl groups connected to the Group 4 transition metal can be dimethylsilyl, diphenylsilyl, alkyl- or aryl-substituted dimethyl- or diphenyl silyl, the alkyl substituent in the 2 position of the 2-alkyl-4-arylindenyl group can be methyl, ethyl, or isopropyl, the aryl substituent in the 4 position of the 2-alkyl-4-arylindenyl group can be optionally substituted naphthyl, tetrahydronaphthyl, fluorenyl, phenanthryl, carbazyl, and hexahydropyrenyl, and the Group 4 transition metal can be Ti, Zr, or Hf, and wherein the metallocene catalyst precursor is activated either before feeding to, or in the reactor with: (ii) an activator selected from the group consisting of methylaluminoxane (MAO), dimethylanilinium- or trityl-fluoroarylborates, wherein the fluoroaryl group is pentafluorophenyl, perfluoronaphthyl, and quadrafluoro-trihydronaphthyl; and polymerizing said propylene and said α-olefin in a homogeneous fluid phase to form an elastic propylene-alpha-olefin copolymer having a propylene crystallinity less than 30 J/g, a Tm <100° C. and a Tg >−45° C., wherein said copolymer has blocky propylene segments with $r_1 r_2$ greater than 1.5.

15. The process of claim 14, wherein the α-olefin is ethylene and the amount of ethylene, relative to the amount of ethylene plus propylene in the feed to the one or more parallel reactor trains of the process, is between 8 and 20 wt %, the reactor is maintained at a pressure between 8.4 MPa and 20.8 MPa, and at a temperature between 50° C. and 130° C. during polymerization.

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above-detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. An elastic propylene-ethylene blocky copolymer comprising an ethylene content from 12 to 25 wt % and at least one non-conjugated diene at between 0.1 wt % and 10 wt % and having a propylene crystallinity less than 30 J/g, a Tm <100° C. and a Tg >−(15° C., wherein said copolymer has blocky propylene segments with $r_1r_2$ greater than 1.5.

2. The elastic propylene-ethylene blocky copolymer of claim 1, wherein the heat of fusion in the second melt cycle is equal to or higher than $0.188 \times E^2 - 8.5 \times E + 95$ J/g, where E equals to the value of ethylene content in wt %.

3. The elastic propylene-ethylene blocky copolymer of claim 1 or 2, having EPP triad regio-defects of less than 3%.

4. The elastic propylene-ethylene blocky copolymer of claim 1, wherein $r_1r_2$ is greater than 2.0.

5. The elastic propylene-ethylene block copolymer of claim 1, wherein the ethylene content is from 15 to 25 wt %.

6. The elastic propylene-ethylene blocky copolymer of claim 1, wherein the propylene crystallinity is less than 25 J/g.

7. The elastic propylene-ethylene blocky copolymer of claim 1, wherein the propylene crystallinity is less than 20 J/g.

8. The elastic propylene-ethylene blocky copolymer of claim 1, having an elasticity of greater than 500% and less than 25% tension set after a first 200% extension.

9. The elastic propylene-ethylene blocky copolymer of claim 1, having an elasticity of greater than 500% and less than 25% tension set after a first 200% extension and less than 10% tension set after a second 200% extension.

10. The elastic propylene-ethylene blocky copolymer of claim 3, having EPP triad regio-defects of less than 2%.

11. The elastic propylene-ethylene blocky copolymer of claim 1, which when formed into pellets has a pellet surface contact angle against water of less than 120°.

12. The elastic propylene-ethylene blocky copolymer of claim 1, which when formed into pellets has a pellet surface contact angle against water of less than 115°.

13. The elastic propylene-ethylene blocky copolymer of claim 1, wherein the non-conjugated diene is selected from the group consisting of ethylidene norbornene (ENB), vinylidene norbornene (VNB), norbornadiene (NBD), 1,5-hexadiene, 1,7-octadiene, and 1,9-decadiene.

14. The elastic propylene-ethylene blocky copolymer of claim 1, having an $MFR_{2.16kg@230C}$ of less than 8 g/10 min.

15. The elastic propylene-ethylene blocky copolymer of claim 14, having an $MFR_{2.16kg@230C}$ of less than 5 g/10 min.

16. The elastic propylene-ethylene blocky copolymer of claim 1, which has a Tm from 30° C. to 100° C.

17. The elastic propylene-ethylene blocky copolymer of claim 16, which has a Tm from 30° C. to 90° C.

18. The elastic propylene-ethylene blocky copolymer of claim 17, which has a Tm from 60° C. to 80° C.

19. The elastic propylene-ethylene blocky copolymer of claim 1, which has a Tg from −45° C. to −10° C.

20. The elastic propylene-ethylene blocky copolymer of claim 19, which has a Tg from −45° C. to −15° C.

21. A polymer blend comprising polypropylene and a blocky copolymer according to claim 1.

22. A polymerization process comprising:
feeding propylene, ethylene at between 12 to 25 wt of the feed, and at east one non-conjugated diene at between 0.1 wt % and 10 wt % of the feed and optionally an inert solvent into one or more reactor trains connected in parallel each reactor rain comprising one or more reactors connected in series;
feeding one or more metallocene catalysts into said one or more reactor trains, wherein the metallocene catalysts comprise:

(i) a metallocene catalyst precursor selected from the group consisting of dimethyl(bridged)bis(2-alkyl-4-arylindenyl)Group 4 transition metal and dichloro(bridged)bis(2-alkyl-4-arylindenyl)Group 4 transition metal compounds, wherein the group bridging the two 2-alkyl-4-arylindenyl groups connected to the Group 4 transition metal can be dimethylsilyl, diphenylsilyl, alkyl- or aryl-substituted dimethyl- or diphenylsilyl, the alkyl substituent in the 2 position of the 2-alkyl-4-arylindenyl group can be methyl, ethyl, or isopropyl, the aryl substituent in the 4 position of the 2-alkyl-4-arylindenyl group can be optionally substituted naphthyl, tetrahydronaphthyl, fluorenyl, phenanthryl, carbazyl, and hexahydropyrenyl, and the Group 4 transition metal can be Ti, Zr, or Hf, and
wherein the metallocene catalyst precursor is activated either before feeding to, or in the reactor with:
(ii) an activator selected from the group consisting of methylaluminoxane (MAO), dimethylanilinium- or trityl-fluoroarylborates, wherein the fluoroaryl group is pentafluorophenyl, perfluoronaphthyl, and quadrafluoro-trihydronaphthyl; and
polymerizing said propylene, said ethylene and said at least one non-conjugated diene in a homogeneous fluid phase to form an elastic propylene-alpha-olefin copolymer having a propylene crystallinity less than 30 J/g, a Tm <100° C. and a Tg >−45° C., wherein said copolymer has blocky propylene segments with $r_1r_2$ greater than 1.5.

23. The process of claim 22, wherein the reactor temperature is maintained at a temperature between 50° C. and 130° C. during polymerization.

24. The process of claim 22, wherein the metallocene catalyst precursor is selected from the group consisting of dimethyl(μ-dimethylsilyl)bis(2-methyl-4-naphthylindenyl)zirconium, dichloro(μ-dimethyl-silyl)bis(2-methyl-4-naphthylindenyl)zirconium, dimethyl(μ-dimethylsilyl)bis(2-isopropyl-4-naphthylindenyl)-zirconium, dichloro(μ-dimethylsilyl)bis(2-isopropyl-4-naphthylindenyl)-zirconium, dimethyl(μ-diphenylsilyl)bis(2-methyl-4-naphthylindenyl)zirconium, dichloro(μ-diphenyl-silyl)bis(2-methyl-4-naphthylindenyl)zirconium, dimethyl(μ-diphenylsilyl)bis(2-isopropyl-4-naphthyl-indenyl) zirconium, dichloro(μ-diphenyl-silyl)bis(2-isopropyl-4-naphthylindenyl)zirconium, dimethyl(μ-dimethylsilyl)bis(2-alkyl-4-carbazylindenyl)zirconium, dichloro(μ-diphenylsilyl)bis(2-alkyl-4-carbazylindenyl)zirconium, dimethyl(μ-diphenylsilyl)bis(2-alkyl-4-carbazyl-indenyl) zirconium, dichloro(μ-diphenylsilyl)bis(2-alkyl-4-carbazylindenyl)-zirconium, dimethyl(μ-dimethylsilyl)bis(2-methyl-4-tetrahydronaphthylindenyl)-zirconium, dimethyl(μ-dimethylsilyl)bis(2-methyl-4-phenanthrylindenyl)-zirconium, dimethyl(μ-dimethylsilyl)bis(2-methyl-4-fluorenylindenyl)zirconium, dimethyl(μ-diphenylsilyl)bis(2-methyl-4-tetrahydronaphthylindenyl)zirconium, dimethyl (μ-diphenylsilyl)bis(2-methyl-4-phenanthrylindenyl) zirconium, dimethyl(μ-diphenylsilyl)bis(2-methyl-4-fluorenylindenyl)zirconium, their corresponding Hf derivatives, and combinations thereof; and
wherein the copolymer has EPP triad regio-defects of less than 3%.

25. The process of claim 22, wherein the reactor is maintained at a pressure between 8.4 MPa and 20.8 MPa during polymerization.

* * * * *